US 6,739,594 B2

United States Patent
Beeck et al.

(10) Patent No.: US 6,739,594 B2
(45) Date of Patent: May 25, 2004

(54) SEALING ARRANGEMENT BETWEEN COMPONENTS OF A ROTATING ASSEMBLY AS WELL AS A METHOD FOR PRODUCING A SEALING JOINT

(75) Inventors: Alexander Beeck, Orlando, FL (US); Ulrich Rathmann, Baden (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 09/988,313

(22) Filed: Nov. 19, 2001

(65) Prior Publication Data

US 2002/0061250 A1 May 23, 2002

(30) Foreign Application Priority Data

Nov. 18, 2000 (DE) .......................................... 100 57 395

(51) Int. Cl.⁷ ................................................ F16J 15/00
(52) U.S. Cl. ..................................................... 277/433
(58) Field of Search ................................ 277/300, 305, 277/433, 500, 503, 505, 506, 543, 579, 580; 415/115; 416/96 R, 97 R

(56) References Cited

U.S. PATENT DOCUMENTS

| | | | |
|---|---|---|---|
| 3,887,198 A | * 6/1975 | McClure et al. | ............ 277/579 |
| 4,198,063 A | * 4/1980 | Shimizu et al. | ............. 277/387 |
| 4,505,200 A | 3/1985 | Bush | |
| 4,730,375 A | * 3/1988 | Nakamura et al. | ..... 29/888.022 |
| 5,240,375 A | 8/1993 | Wayte | |
| 5,297,804 A | 3/1994 | Siegrist et al. | |
| 5,344,162 A | * 9/1994 | Kernon et al. | ............... 277/433 |
| 5,593,274 A | * 1/1997 | Carreno et al. | ............. 415/115 |
| 5,941,537 A | * 8/1999 | Wallace et al. | ............. 277/642 |
| 5,971,707 A | * 10/1999 | Uematsu et al. | .......... 416/96 R |

FOREIGN PATENT DOCUMENTS

EP 0 890 710 A2 1/1999

* cited by examiner

Primary Examiner—Lynne H. Browne
Assistant Examiner—Michael J. Kyle
(74) Attorney, Agent, or Firm—Burns, Doane, Swecker & Mathis, L.L.P.

(57) ABSTRACT

A sealing arrangement between two radially adjoining components of an assembly that rotates during operation, in particular between the rotor and the rotating blade of a gas turbine component includes a sealing element in a depression of an inner one of the two components at the boundary surface to the outer one of the two components. The sealing element is designed in such a way that it does not or does only slightly project beyond the depression during assembly and that, during rotation of the assembly, the centrifugal force acting on it produces a sealing joint between the components. The present sealing arrangement permits an easy installation of rotating blades to the rotor of a gas turbine.

17 Claims, 4 Drawing Sheets

SEALING ARRANGEMENT BETWEEN COMPONENTS OF A ROTATING ASSEMBLY AS WELL AS A METHOD FOR PRODUCING A SEALING JOINT

FIELD OF THE INVENTION

The present invention relates to a sealing arrangement between two radially adjoining components of an assembly rotating during operation, in particular the rotor and rotating vane of a gas turbine component, with a seal element in a depression of an inner one of the two components at the boundary surface towards the outer one of the two components, as well as a method for the production of a sealing joint between two components.

Steam-cooled gas turbine components require very reliable seals for the transport of the steam used for cooling, since a leak on the one hand reduces the efficiency of the thermodynamic process and on the other hand reduces the life span of the component due to the resulting poorer cooling. There are special requirements for the sealing joints of rotating components, for example, for turbine rotating blades, since the steam in these cases must be passed from the resting system into the rotating system. In the same way, the steam must again be returned from the rotating component into the resting system, so that typically two sealing joints per component are necessary. As a rule, such sealing joints are required between the cooling channels in the rotor plate and between the cooling channels in the rotating blades of the turbine. The rotating blades are hereby suspended with their blade base in corresponding grooves or guides in the rotor plate, whereby both the groove and the blade base are provided with appropriate complementary, usually pine-tree-shaped geometries. The transition of the cooling channels from the rotor plate to the rotating blade and vice versa takes place within this groove of the rotor plate.

Because of the required seals, the assembly of the rotating blades and the rotor, during which the blade base is pushed laterally into the corresponding groove on the rotor plate, is very complex.

BACKGROUND OF THE INVENTION

An example of a sealing joint between the rotor plate and rotating blades of a turbine component is shown in U.S. Pat. No. 5,318,404. The sealing arrangement shown there is formed by depressions in the blade base and rotor plate that respectively face each other, and in which a sleeve-like sealing element is located. This sealing element seals the joint between the cooling channels in the rotating blade and the cooling channels in the rotor plate. To permit a better installation of the sleeve-like sealing elements, which in the installed state extend over the full radial extension of the chamber formed by the depressions, it is suggested that these sealing elements are designed with radial elasticity. During assembly, they are then pushed completely into the depression on the rotor disk when the rotating blade is pushed in, and, because of their preload, expand into the corresponding depression at the base of the rotating blade as soon as the two depressions are located on top of each other. The sealing elements are hereby designed so that, even after the assembly of the rotating blades, their preload will still be sufficient to achieve the pressure against the rotor plate and rotating blade required for the sealing effect.

Such a design of the sealing joint indeed facilitates the assembly of the rotating blades when compared to rigid sealing elements; however, because the sealing elements must be pushed against the preload during the installation of the rotating blades, complications may still be encountered.

Based on this start of the art, the invention is based on the objective of disclosing a sealing arrangement as well as a method for producing a sealing joint between two components that enable an easier installation of the components, in particular of the rotating blades to the rotor plate of a gas turbine component.

SUMMARY OF THE INVENTION

The sealing arrangement according to the invention between two radially adjoining components of an assembly rotating during operation, in particular the rotor and rotating vane or blade base of a gas turbine component, is provided in the known manner with a sealing element in a depression of an inner one of the two components at the boundary surface towards the outer one of the two components. In the present sealing arrangement, the sealing element is designed in such a way that, during the assembly, i.e., while it being inserted or placed into the depression, it does not project or does project only slightly beyond the depression, and during the rotation of the assembly, as a result of the centrifugal force acting on it, produces a sealing joint between the components. The radial dimension of the sealing element—in relation to the rotation axis of the assembly—therefore must be chosen so that (during the insertion of the sealing element) it does not exceed or does only insignificantly exceed the depth of the depression at the inner component, i.e., the component that is located closer to the rotation axis. This facilitates an easy pushing in of a rotating blade into the dove-tail- or pine-tree-shaped groove on the rotor plate, since the sealing element set into the depression no longer interferes with the sliding process. An arrangement projecting slightly beyond the depression here means that the sealing element only projects beyond the depression to such an extent that it just does not interfere during the assembly. In contrast to the state of the art described previously, this technique does not require a pressing down of the sealing element.

The actual sealing effect in the present sealing arrangement is achieved only with a rotation of the assembly, during which the sealing element is pressed with its sealing surfaces against the sealing surfaces of the outer component and, if required, against the inside wall of the depression. Different designs are possible for the sealing elements required for this and are described in the secondary claims as well as in the exemplary embodiments.

One principal design option is that the entire sealing element is moved, under the influence of centrifugal force, towards the second component and is pressed against it, whereby laterally deformable and/or elastic edge areas at the same time are pressed against the side wall of the depression of the inner component. According to another possibility, a lower part of the sealing element is fixed in the depression, and an upper or outer part is designed in an expandable manner. The expandable part is hereby pressed under application of a centrifugal force against the outer component. In all cases, the outer component can be constructed either without or with a corresponding depression.

Suitable materials for sealing elements are known to the expert. In the present sealing arrangement, these may be elastic or partially elastic sealing elements that return to their starting shape in the resting state of the assembly. It is, however, also possible to use deformable materials as sealing elements that change their shape as a result of the centrifugal force acting on them in order to bring about the necessary sealing effect, and to maintain this last shape once the assembly is turned off or is in its resting state. In the first case, the sealing elements return to their starting position in the depression in a corresponding position of the assembly in the resting state, so that the rotating blades also can be easily disassembled. In the second case, the sealing elements must be destroyed during the disassembly of the rotating blades.

The sealing elements or seals of the present sealing arrangement that are only pressed into the seal seat by centrifugal force during the rotation of the assembly can be very simply constructed. Nevertheless, when used in gas turbines, they seal very effectively since high centrifugal forces (approximately 10,000 g) are achieved at the respective speeds. The seals can be designed so that they return to their starting position when the machine stands still, which facilitates the removal of the blades. This can be supported by additional machine elements, such as springs.

Another embodiment of a sealing arrangement according to the invention used to realize the above mentioned objective also uses centrifugal force in order to create the sealing joint. This alternative embodiment also uses a sealing element that does not or does only slightly project beyond the depression on the inner component. The outer component is hereby suspended or attached in such a way that the forces occurring during the rotation of the assembly apply a tilting moment to the outer component, which causes it to be pressed against the seal. In this manner, the sealing joint also is only created during operation of the assembly in this case. The sealing element hereby can be constructed in an even simpler manner and should project slightly beyond the depression, but only to such an extent that it does not hinder the installation of the rotating blade.

In principle, the present arrangement can be used for any sealing tasks. However, it is preferably used for creating a sealing joint between cooling channels in the two radially adjoining components.

The method according to the invention for the production of a sealing joint between two components also uses the action of a centrifugal force in order to create the sealing joint. Hereby a sealing element is set into the depression of the first component. The sealing element is designed in such a way that it does not or does only slightly project beyond the depression after it has been inserted into the this depression and is able to create the sealing joint after being acted on by a force directed towards the second component. After the sealing element has been placed into the depression and the second component has been assembled, a centrifugal force directed towards the second component acts on the sealing element, which centrifugal force is produced in that both components of the assembly are brought to rotate or they are spun in a suitable manner.

This method makes it possible to produce a sealing joint even between components that do not rotate during operation by spinning them accordingly prior to their use. Naturally, the latter case requires that a sealing element is used that no longer returns into its starting shape and/or its starting position after the spinning. A sealing element that is solid during assembly and melts during the spinning when exposed to an increased temperature can be used especially advantageously for this. The molten mass then adapts to the gap to be sealed, so that an optimum seal is achieved after cooling.

Naturally, the present sealing arrangement and the described sealing method can be used for any sealing tasks. The application of the invention is not limited to the preferred use in gas turbine components, even though it offers significant advantages there.

BRIEF DESCRIPTION OF THE DRAWINGS

The present sealing arrangement as well as the method for producing a sealing joint are explained again below using exemplary embodiments in reference to the schematic drawings without limiting the general concept of the invention. Hereby.

DETAILED DESCRIPTION OF THE PREFERRED EMBODIMENT

Figures 1A, 1B:
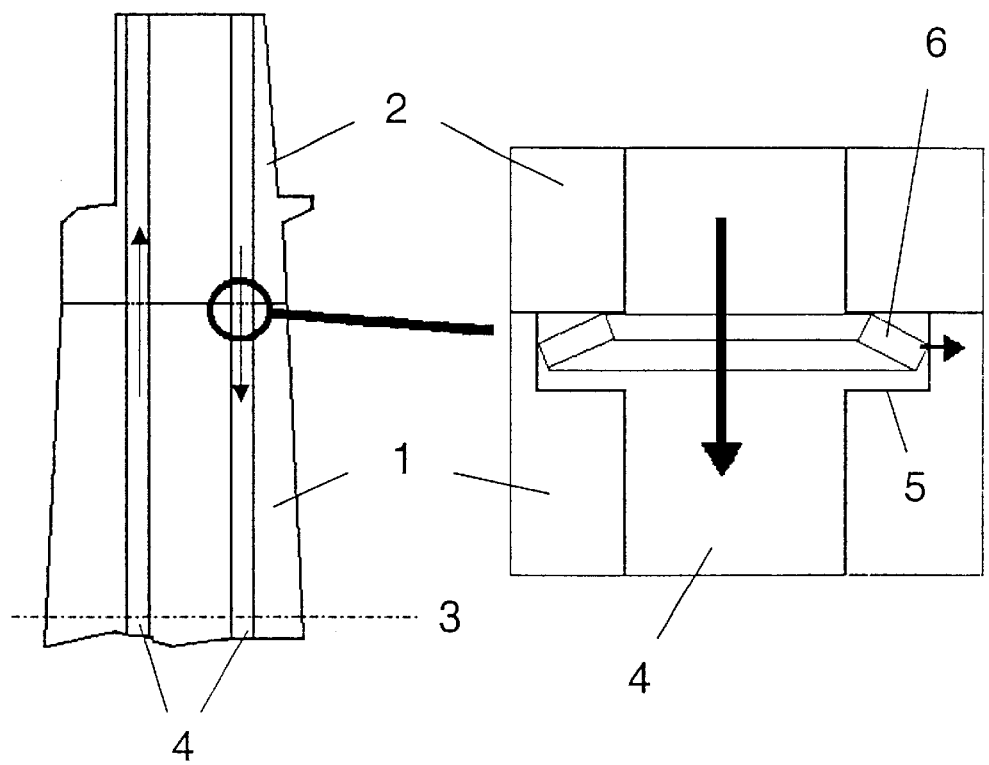
FIG. 1 shows a first example of a sealing arrangement for sealing a cooling channel joint between the rotor plate and rotating blade of a gas turbine.

FIG. 1a shows a partial view of a section through a joint between a rotor blade 1 and rotating blade 2 of a gas turbine. The joint of these two components is achieved in the manner already described in the introduction part of this present patent application. The figure furthermore indicates the rotation axis 3, around which the rotor plate 1 with rotating blades 2 rotates during operation. Also shown are two cooling channels 4, of which the left one is used for supplying steam from the rotor plate 3 to the rotating blade 2, and the right one to remove steam from the rotating blade 2. The respective flow directions of the steam used for cooling the rotating blade are indicated in the drawing by arrows. Good seals are especially necessary in the area of the cooling channel 4 at the boundary surface between the rotor plate 1 and rotating blade 2 so that the cooling effect is not adversely affected by leakage at this point.

FIG. 1b shows an enlarged view of the area of the interface between rotating blade 2 and rotor plate 1 in the area of the cooling channel for the steam removal of FIG. 1a. The flow direction of the steam is again indicated by the arrow extending in the cooling channel direction. The rotor plate shows a depression 5, in which a sealing element 6 is arranged. The illustration (FIG. 1b) shows a state as it occurs during the rotation of the assembly around the rotation axis 3.

In the present case, the sealing element 6 is constructed like a plate spring and has a central through-hole for the steam. As a result of this plate-spring-like construction, a central part of the sealing element is pressed by the centrifugal force, which in the figure is directed opposite to the flow direction, against a corresponding surface of the rotating blade 2. The edge areas of the sealing element 6 that are facing away from the rotating blade 2 are also pressed as a result of the occurring centrifugal force towards the rotating blade 2 and therefore automatically against the lateral surfaces of the depression 5 of the rotor plate (indicated by lateral arrow). This effect of the centrifugal force causes the cooling channel joint between the rotating blade 2 and rotor plate 1 to be well sealed. The sealing element 6 is hereby constructed so that it does not project beyond the depression 5 in the resting state.

Naturally, such a sealing arrangement is used for all cooling channel joints of the rotor plate with the rotating blades.

Figures 2A, 2B:
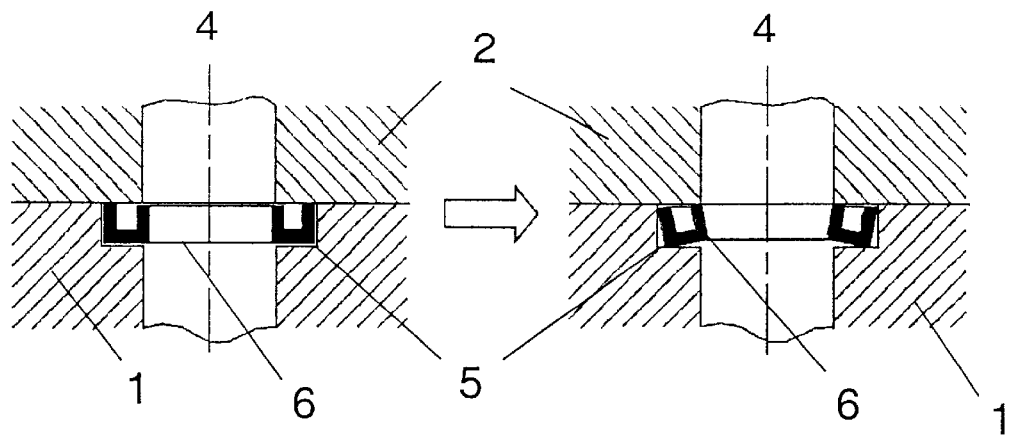
FIG. 2 shows a second example of a sealing arrangement for sealing a cooling channel joint between the rotor plate and rotating blade of a gas turbine.

FIG. 2 shows another example for designing a sealing element 6 for sealing a joint between two components 1, 2. The channel joint to be sealed is designed with the reference number 4 in this and the following exemplary embodiments. FIG. 2a hereby shows an annular design of the sealing element 6 with a U-shaped cross-section of the sealing body. An annular design hereby does not only mean circular shapes of the ring, but also other, e.g., elliptical shapes. The sealing element has a central through-hole and is seated in a depression 5 constructed on the inner component 1.

FIG. 2a in particular shows that the sealing element 6 does not project beyond depression 5 in the shown (resting) state. In this state, no sealing joint is produced between the two components 1, 2. The sealing element 6 is constructed so that the outer leg of the sealing body with its U-shaped cross-section projects beyond the inner leg. Such a design permits an optimum seal as a result of the centrifugal force acting during the rotation of the components.

FIG. 2b shows the state during the rotation, during which the centrifugal force acts on the sealing element 6. This action, in combination with the legs of different legs, causes the U-shaped edge to tilt outward, so that the outer leg is pressed against the side wall of the depression 5, and the inner leg is pressed against the sealing surface of the outer component 2. This shows that the desired sealing effect is achieved. This effect is particularly very reliable when used in the rotating component of a gas turbine, since the centrifugal forces that are created are sufficiently high.

Figures 3A, 3B:
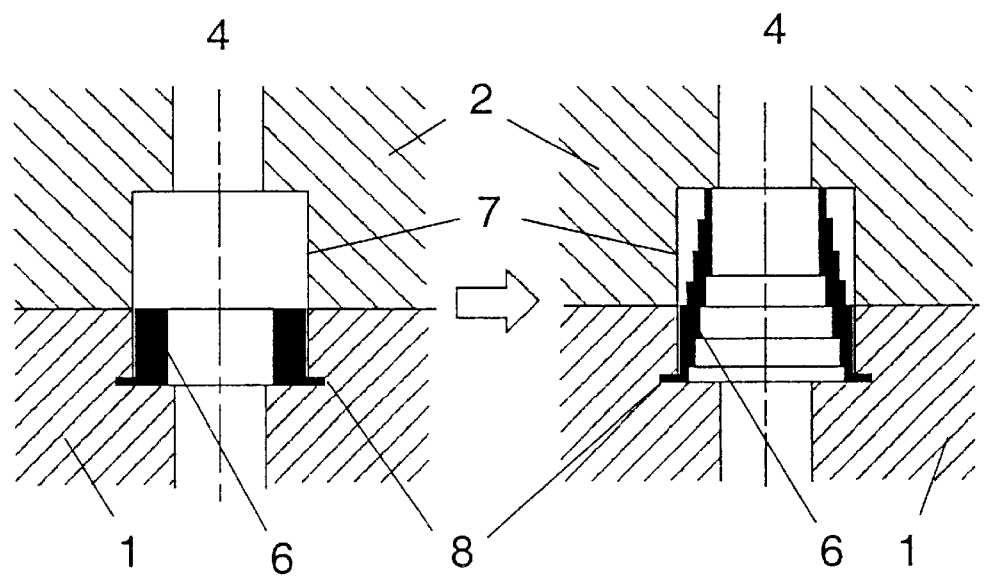
FIG. 3 shows a third example of a sealing arrangement for sealing a cooling channel joint between the rotor plate and rotating blade of a gas turbine.

Another example for designing a sealing arrangement according to the present invention is shown in FIG. 3. In this case, the outer component 2 is also provided with a depression 7. The sealing element 6 is fixed via a corresponding groove 8 in the depression. This fixation already presses the sealing element against the inner component 1 in a sealing manner. FIG. 3a again shows the resting state, as it occurs, for example, shortly after the assembly of the components. In the resting state, the sealing element 6 does not project beyond the depression 5 in the inner component 1, for example, the rotor plate. However, no sealing effect is achieved in this state yet. In the present example, the sealing element 6 is designed in such a way that during the rotation of the assembly the created centrifugal force causes it to be extended in a telescoping manner, as can be seen in FIG. 3b. Such a telescope-like construction of the sealing element 6 can be accomplished, for example, by winding the sealing element from a thin sheet metal. The action of the centrifugal force causes the telescope-like transverse of the sealing element 6 to be pressed with great force against the corresponding sealing surfaces on the outer component 2, and in this way creates the well-sealing joint of the cooling channels 4 between the two components. When the assembly is turned off, the sealing element, depending on the chosen material, may be able to return to the starting position shown in FIG. 3a or remain in the position shown in FIG. 3b in the resting state.

Figures 4A, 4B:
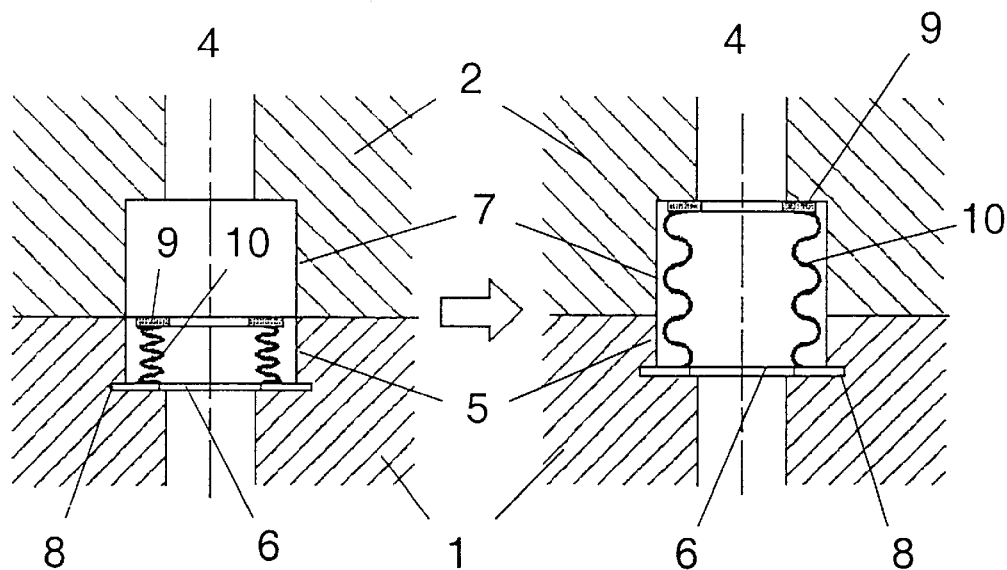
FIG. 4 shows a fourth example of a sealing arrangement for sealing a cooling channel joint between the rotor plate and rotating blade of a gas turbine.

FIG. 4 shows another exemplary embodiment for a sealing arrangement that is constructed similar to the one in FIG. 3. In this case, the sealing element 6 is fixed, as in FIG. 3, via a groove 8 in the depression 5 of the inner component 1. The side of the sealing element 6 facing the outer component 2 is provided with a washer 9, for example, of a soft metal, which is connected to the fixed part of the sealing element via a bellow 10. The washer 9 is hereby used as mass that is pressed by the centrifugal force occurring during operation against the seal seat on the outer component 2, as can be seen in FIG. 4b. The bellow 10 is hereby pulled apart. FIG. 4a again shows that the sealing element 6 with the washer 9 and the bellow 10 does not project beyond the depression 5 in the resting state, such as during the assembly of the components.

Figure 5:
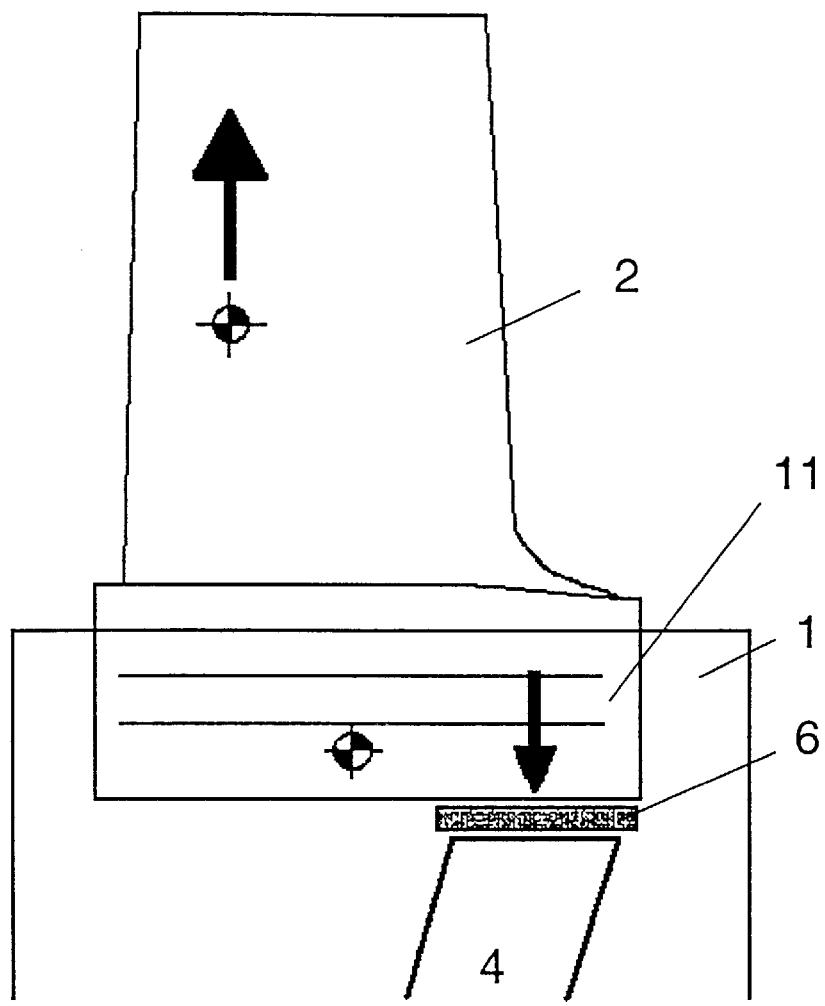
FIG. 5 shows a fifth example of a sealing arrangement for sealing a cooling channel joint between the rotor plate and rotating blade of a gas turbine; and, FIG. 6 shows a sixth example of a sealing arrangement for sealing a cooling channel joint between the rotor plate and rotating blade of a gas turbine.

FIG. 5 shows an exemplary embodiment of a sealing arrangement in which the sealing effect is created as a result of the action of the centrifugal force on the rotating blade 2 of a gas turbine. The attachment of the rotating blade 2 is hereby designed so that the centrifugal force occurring during the rotation creates a tilting moment that presses parts of the blade base 11 onto a sealing element 6 or a specific point of the rotor plate 1. The effect of the tilting moment is indicated by the two arrows. The cooling channel 4 in the rotor plate 1 hereby can only be seen as a very schematic illustration. The cooling channels in the rotating blade 2 are not shown. The sealing element 6 in such an embodiment can be designed in a simplified manner, for example, annular with a round or rectangular cross-section. It should only project slightly beyond the corresponding depression in the rotor plate 1 so that it will not hinder the installation of the rotating blade 2. The sealing effect hereby is achieved by the tilting moment of the rotating blade 2 that occurs during rotation, which creates the required pressure for pressing against the sealing element 6.

Figures 6A, 6B:
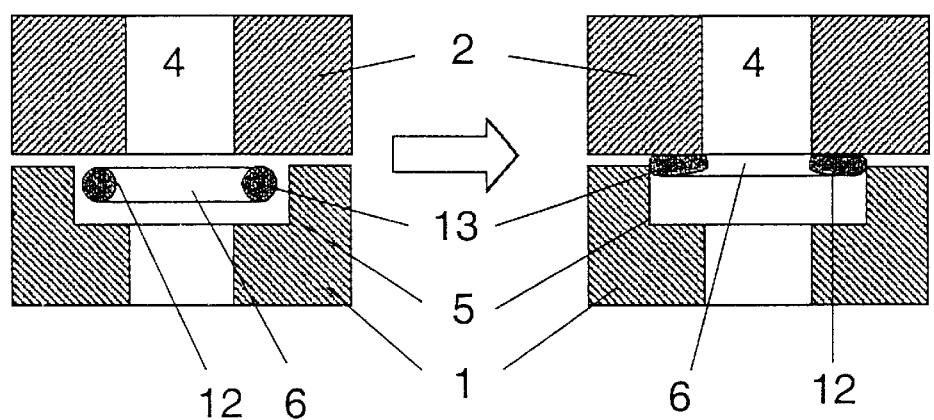

FIG. 6 finally shows a last example for a design of a sealing arrangement according to the invention. In this exemplary embodiment, the sealing element 6 is again seated in the depression 5 on the inner component 1 in the resting state (FIG. 6a). In the present case, this sealing element 6 consists of an enclosing ring of a thin material 12 that is filled with a fluid 13. When, during the rotation of the assembly (FIG. 6b), the centrifugal force acts on it, the sealing element 6 deforms in such a way that all leakage surfaces are sealed. An example of such a sealing element 6 is a metallic O-ring filled with sodium or another substance that has a low melting point. With rising temperature, the filling 13 melts, and the centrifugal force causes a fluid pressure distribution that deforms the sealing ring 6 in such a way as to create an optimum seal.

With a suitable design of the sealing surfaces on both components and a high surface tension of the molten mass, the enclosure 12 of the thin material also may be eliminated. The seal is then achieved solely with the fluid 13, whereby the internal pressure is at an equilibrium with the surface tension. The centrifugal forces occurring during rotation press the sealing fluid 13 into the desired shape.

This version of the solution also permits a self-casting seal. The seal is hereby formed of a material that melts after assembly because of the high temperatures that occur and then completely fills the corresponding area to be sealed. Because the alloy elements diffuse from the adjoining material of the usually metallic components, the melting point of the sealing materials gradually increases, and the seal becomes solid. For sealing, the seal is again pressed in the form of a molten mass by centrifugal force into the correct shape in this embodiment also. This technique also can be used to produce seals for non-rotating components. In this case, the necessary centrifugal forces only must be generated by spinning the components during the production of the seal. This realizes a seal that exactly matches the corresponding component. In this way, seals for the guide vanes of a gas turbine can be realized, for example.

In principle, the materials used for the sealing element also can be chosen that have a thermal coefficient of expansion that is greater than that of the surrounding parts. This makes it possible that the sealing effect is supported further during operation by the additional thermal expansion of the sealing element. Memory alloys or bi-metals also can be used as materials for the sealing element.

What is claimed is:

1. A sealing arrangement, comprising:
    a first member and an adjacent second member, the first member and the second member belonging to a rotor arrangement, wherein the second member is located radially outwardly of the first member;
    a flow channel extending through the first member and the second member, said flow channel having a seam at a contacting surface between the first and the second adjacent members, said seam to be sealed off during rotor rotation;
    the first member having a recess on the contacting surface surrounding the flow channel, the recess thus being arranged between the first and second members, a sealing member being provided in the recess;
    wherein the sealing member is designed and made to have a clearance with at least one of the first and second members in static conditions, and to provide a sealing contact with a least one sealing surface of each of the first and second members when centrifugal forces act due to rotation of the rotor, thus providing a sealing of the flow channel during operation, wherein the sealing effect is affected by a displacement of the sealing member in connection with at least one of an elastic deformation of the sealing member or a plastic deformation of the sealing member due to centrifugal forces acting during rotation of the rotor.

2. The sealing arrangement as claimed in claim 1, wherein the sealing effect is affected by at least one of: elastic deformation of the sealing member, plastic deformation of the sealing member, displacement of the sealing member, relative displacement of pieces of a multi-piece sealing member, or a combination of any of the preceding, due to centrifugal forces acting during rotation of the rotor.

3. The sealing arrangement as claimed in claim 1, wherein the recess is essentially circular and coaxial with the flow channel.

4. The sealing arrangement as claimed in claim 1, wherein the sealing member is provided with a central area with a through-hole and an edge area.

5. The sealing arrangement as claimed in claim 4, wherein the sealing member is designed and made such that, due to centrifugal forces acting on the sealing member, the central area is pressed against the second member, and the edge area is pressed against the side walls of the recess of the first member.

6. The sealing arrangement as claimed in 5, wherein the sealing member has a frusto-conical, wherein the basis of the frusto-cone is oriented radially inwardly.

7. The sealing arrangement as claimed in claim 4, wherein the sealing member is an annulus of a U-shaped profile, with a basis, a first leg provided at the center, a second leg provided at the edge, and an open side, wherein the open side is oriented radially outwardly of the rotor, and wherein the central leg has a lesser extend from the basis than the edge leg.

8. The sealing arrangement as claimed in claim 1, wherein the sealing member is inserted loosely into the recess.

9. The sealing arrangement as claimed in claim 1, wherein the sealing member comprises an expandable element having a first end and a second end, the first end rigidly fixed in the recess, and the second end being provided with a washer, which is pressed against the second member due to centrifugal forces acting on it during rotation of the rotor.

10. The sealing arrangement as claimed in claim 9, wherein the expandable element has a telescope-like design.

11. The sealing arrangement as claimed in claim 9, wherein the expandable area is formed by a bellow.

12. The sealing arrangement as claimed in claim 1, wherein the sealing member is made of a cushion containing one of: a fluid, or a material that liquefies at the operating temperature of the assembly.

13. The sealing arrangement as claimed in claim 12, wherein the cushion is donut-shaped.

14. The sealing arrangement as claimed in claim 1, wherein the sealing member has a thermal coefficient of expansion that is above that of the first and second members.

15. A method of sealing a seam in a flow channel, which flow channel extends through at least a first member of an assembly and an adjacent second member of an assembly, whereby the seam is formed at the contacting surface of the first and second members,
    the method comprising the steps of:
        providing a recess in the first element on the contacting surface of the first member, said recess surrounding the flow channel;
        inserting a sealing member into said recess, said sealing member being designed and made to have a clearance with at least one of the first and second members in static conditions, and to provide a sealing contact with a least one sealing surface of each of the first and second members when centrifugal forces act due to rotation of the assembly around a rotational axis which is closer to the first element than to the second element; and
        applying a centrifugal force to the assembly by way of rotating or spinning of the assembly around said axis of rotation, wherein the sealing effect is affected by a displacement of the sealing member in connection with at least one of an elastic deformation of the sealing member or a plastic deformation of the sealing member due to centrifugal forces acting during rotation of the rotor.

16. The method as claimed in claim 15, further comprising the step of:
    melting the sealing member by increasing the temperature during the spinning or rotating of the two components.

17. The method as claimed in claim 15, further comprising the step of:
    increasing the rotational speed such that the centrifugal forces affect a plastic deformation on the sealing member, thus producing a lasting sealing.

* * * * *